United States Patent [19]

Boldebuck

[11] 3,767,550

[45] Oct. 23, 1973

[54] METHOD FOR IMPROVING THE SHELF LIFE OF POLYAMIDE ACID DISPERSIONS FOR ELECTRODEPOSITION

[75] Inventor: Edith M. Boldebuck, Schenectady, N.Y.

[73] Assignee: General Electric Company, Schenectady, N.Y.

[22] Filed: Dec. 13, 1971

[21] Appl. No.: 207,520

[52] U.S. Cl. ............................................... 204/181
[51] Int. Cl. .............................................. B01k 5/02
[58] Field of Search ................................... 204/181

[56] References Cited
UNITED STATES PATENTS
3,537,970   11/1970   Holub et al. ...................... 204/181

Primary Examiner—Howard S. Williams
Attorney—John F. Ahern et al.

[57] ABSTRACT

A method is provided for improving the shelf life of polyamide acid dispersions which are useful as electrocoating compositions for making composites of polyimide and metal substrates, such as insulated conductors, insulated metal substrates useful for making capacitors, etc. Improved results are achieved by maintaining the temperature of the dispersion of polyamide acid below about 15° C during the shelf period.

4 Claims, No Drawings

METHOD FOR IMPROVING THE SHELF LIFE OF POLYAMIDE ACID DISPERSIONS FOR ELECTRODEPOSITION

The present invention relates to polyamide acid dispersions having improved shelf stability and a method for making such compositions.

Prior to the present invention polyamide acid mixtures as shown by Holub et al. U.S. Pat. No. 3,507,765, were useful for making composite structures of polyimide film and metal substrates by effecting the electrodeposition of the polyamide acid onto the metal substrate followed by heating the polyamide acid to the polyimide state.

Experience has shown that aqueous dispersions of polyamide acid can degrade rapidly at ambient temperature i.e. between 25° to 35° C, if they have a sufficient number of chemically combined un-neutralized amide acid units of the formula,

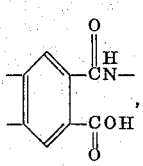

to provide for at about 0.4 meq of carboxy/g of polyamide acid, where the unsatisfied valence bonds of the un-neutralized amide acid unit of formula (1) can be joined to a monovalent or polyvalent radical such as hydrogen, carboxy, amido, carbonamido, etc. in conjunction with being part of the polyamide acid backbone.

As used hereinafter, the term degrade, degradation, etc. when applied to defining a change in characteristics of the polyamide acid dispersion, defined herein over a given shelf period, such as 3 days or more, signifies a lowering of the ability of the polyamide acid dispersion to form an electrodeposit having at least 20% by weight solids.

One method to retard the degradation rate of aqueous polyamide acid mixtures. is to add to it, a neutralizing amount of base to convert substantially all of the available units of formula (1) to chemically combined units of the formula,

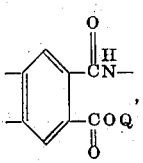

where Q is a base cation, such as an ammonium radical, and the unsatisfied valences can be satisfied by the previously defined radicals including base neutralized carboxy radicals as defined above. Although base neutralization of polyamide acid has been found to substantially improve the shelf stability of polyamide acid electrocoating mixtures, those skilled in the art know that satisfactory film builds of electrodeposited polyamide acid onto metal substrates, such as at least 0.010g of polymer solids per coulomb, referred to sometimes as "coulomb yield," can only be achieved, if the degree of neutralization of formula (1) units is sufficient to provide for a range of up to about 1.0 meq of base/g of polymer solids. Experience has shown that polyamide acid electrocoating mixtures generally do not provide a satisfactory coulomb yield when fully neutralized. As a result, only limited batches of polyamide acid dispersions are prepared at a time, since extensive degradation of the unused polyamide acid dispersion can occur within a week or less.

The present invention is based on the discovery that the shelf life of electrocoatable dispersions of polyamide acid having a high coulomb yield can be substantially improved, that is extended to a shelf life factor of at least four times the expected shelf life of the polyamide acid allowed to remain at ambient temperatures after preparation, if the polyamide acid dispersion is maintained before it has degraded, at a temperature below at least 15° C and preferably, 0 to 5° C before it is electrodeposited.

There is provided by the present invention a method for electrodepositing a polyamide acid onto a conducting substrate, utilizing an aqueous dispersion of said polyamide acid having a tendency to deteriorate when allowed to remain at ambient temperatures producing a polyamide acid mixture incapable of providing an electrodeposit having at least about 20% by weight of solids, involving the improvement of maintaining the aqueous polyamide acid dispersion at a temperature between about $-10°$ C to 15° C prior to its electrodeposition and before it has substantially deteriorated, whereby the shelf life of such aqueous polyamide acid dispersion is substantially improved.

The polyamide acid dispersion prepared in accordance with the present invention can be made by initially forming a polyamide acid solution by standard means. For example, a reaction can be effected between substantially equal molar amounts of organic diamine and organic anhydrides or mixtures of organic anhydrides with organic dicarboxylic acids, organic dicarboxylic acid chlorides, chloroformylphthalic anhydride, etc. in a polar aprotic organic solvent chemically inert to the reactants during the reaction. After the polyamide acid solution has been formed, which may contain from about 5 to 30% by weight of polyamide acid solids, based on the weight of solution, there can be added water along with a suitable base, which preferably can be added prior to, or simultaneously with the addition of water to produce an aqueous dispersion of the polyamide acid.

Included among the organic anhydride which can be employed to make the polyamide acid, is for example, trimellitic anhydride, chloroformylphthalic anhydrides, organic dianhydrides, such as pyromellitic dianhydride, benzophenone dianhydride, ethylene glycoltrimellitate anhydride, and dianhydrides resulting from the reaction between trimellitic anhydride and organic diamines defined hereinafter, etc.

Included among the organic diamines which can be employed are for example, $C_{2-8}$ alkylene diamines, meta phenylene diamine, and diamines having the formula,

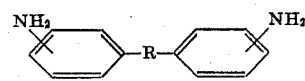

where R is a divalent radical selected from the class consisting of $C_{1-3}$ alkylene, carbonyl, oxygen, sulfone, silyl, etc. Included by the amide acid units having the characteristic units of formula (1), which can be made by forming the polyamide acid from the above described organic anhydride and organic diamine are for example,

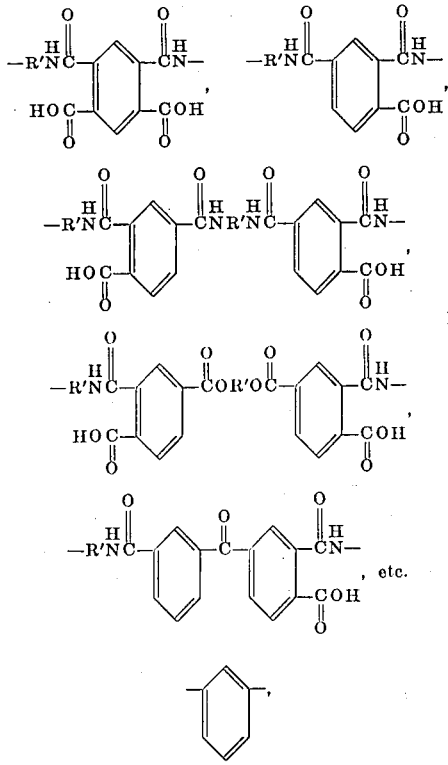

where R' can be selected from $C_{2-8}$ alkylene radicals,

and divalent organo radicals derived from organic diamines of formula (3).

Included by the polar organic solvents which can be employed in the present invention are for example, N,N-dimethylformamide, N,N-dimethylacetamide, N,N-diethylformamide, N,N-diethylacetamide, N,N-dimethylmethoxy acetamide, N-methyl caprolactam, dimethylsulfoxide, N-methyl-2-pyrrolidone, tetramethyl urea, tetramethylene sulfone, N-methylformamide, N-acetyl-2-pyrrolidone. In addition, other diluent solvents substantially inert during the practice of the method can also be utilized, such as hydrocarbons, alcohols, ethers, etc.

Included among the bases which can be utilized in the practice of the invention to partially neutralize the carboxy radicals of the above described polyamide acid are for example, any organic or inorganic bases which will facilitate the electrodeposition of the polyamide acid. For example, there can be employed hydroxides of alkali metals and tetraorgano ammonium radicals. Included among the alkali metal bases are alkoxides and aryloxides. Included by the bases which can be employed are for example, alkali metal hydroxides, such as sodium, potassium, lithium, etc.; tetraalkyl ammonium hydroxides, such as tetramethyl, tetrabutyl, etc., alkoxides such as sodium methoxide, potassium ethoxide, etc., phenoxides, such as sodium phenoxides, potassium phenoxides, etc. In addition, organic bases such as guanadine, etc., and alkali metal salts of weak acids having acid dissociation constants of $10^{-7}$ or less, which produces alkali metal hydroxides insitu in aqueous solutions also can be employed. Water soluble organic amines, such as, for example, pyridine, dimethylethanolamine, triethylamine, diethylamine, morpholine, etc. or ammonium compounds selected from ammonia or ammonium hydroxide, ammonium salts, etc. also can be used.

In order that those skilled in the art will be better able to practice the invention, the following examples are given by way of illustration and not by way of limitation. All parts are by weight.

EXAMPLE 1

A polyamide acid dispersion was made by initially preparing a polyamide acid solution by effecting reaction between 95.64 parts of benzophenone tetracarboxylic dianhydride, and 57.15 parts of methylene dianiline in 866 parts of anhydrous N-methylpyrrolidone. Based on method of preparation, there was obtained a solution of a polyamide acid consisting essentially of the following chemically combined units.

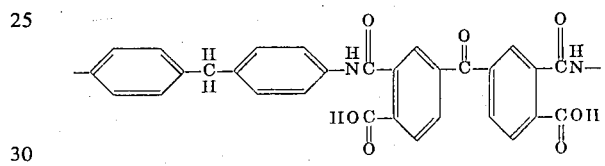

A dispersion was prepared from the above described polyamide acid solution by mixing 60 parts of the above polyamide acid solution with 60 parts of N-methylpyrrolidone to which there was added 3.46 parts of 1 N aqueous ammonium hydroxide along with 60 parts of distilled water. During the addition, the mixture was constantly stirred and the addition of the water took approximately 20 minutes utilizing a dropping funnel and a magnetic stirrer. Based on method of preparation, there was obtained a polyamide acid dispersion having about 5% polyamide acid solids and about 0.38 meq $NH_3/g$ of polymer. The polyamide acid consisted essentially of the above unneutralized amide acid units and neutralized amide acid units of the formula,

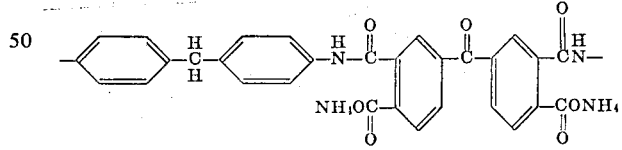

The above polyamide acid dispersion was then divided into two equal parts, A and B. Dispersion A was allowed to remain at ambient temperatures over a period of about one month during which time electrodeposition tests were made to determine whether or not degradation had occured based on the percent by weight of solids in the wet electrodeposit.

The electrocoating tests were made with a weighed copper anode strip 1 inch wide facing a platinum cathode strip of the same size, spaced ½ inch from the anode. The electrodes were immersed in the dispersion to a depth of 1 inch and were connected to a DC constant current supply, regulated at 40 ma. At the end of 1 minute electrocoating time, the electrodes were removed from the electrocoating bath. The increase in weight of the anode due to the wet, electrodeposited film was measured. The anode strip was then put in an air circulating oven and heated for 1 minute at 125° C, followed by 5 minutes at 250° C. The copper anode strip was then reweighed to obtain the weight of the cured polymer solids.

In accordance with the above electrocoating procedure, electrodeposits were obtained from part A of the above polyamide acid dispersion after a 1 day, 7 day, 10 day, 14 day, 21 day, and 31 day period at ambient temperatures. Electrodeposition tests on part B were also carried out after storage for one day at room temperature and after 11 days while being maintained at a temperature between 0° C to 5° C. Additional test samples from portion B were also electrodeposited after 22 days, 29 days, 50 days, 81 days, and 180 days, while the dispersion was being stored during this period between 0° C–5° C. The electrodeposition of dispersion B was performed after the mixture had been allowed to warm to room temperature. A titer of dispersion B was also electrodeposited after 11 days at 0° C–5° C following the same procedure, except electrodeposition was effected at a temperature of about 8.6° C.

The following results were obtained with dispersions A and B following the above procedure where the weight percent solids in the wet deposit is calculated by dividing the weight of wet film into the weight of the cured film.

TABLE

| No. of Days on Shelf | Shelf Temp. | Electrodeposition Temp. | % Solids In Wet Electrodeposit |
|---|---|---|---|
| 1 | 25°C | 25°C | 33 |
| 7 | | | 21 |
| 10 | | | 17 |
| 14 | | | 10 |
| 23 | | | 7 |
| 31 | | | 7 |
| 11 | 0°–5°C | | 34 |
| 22 | | | 33 |
| 29 | | | 33 |
| 50 | | | 32 |
| 81 | | | 30 |
| 180 | | | 25 |
| | | 9°C | |

The above results show that the polyamide acid dispersion deteriorated significantly after about 7 days at ambient temperatures, whereas its degradation was substantially retarded even after 180 days when the temperature was maintained between 0° C and 5° C.

Although the above example is limited to only one type of polyamide acid which can be stabilized by the method of the present invention, it should be understood that the present invention is directed to a much broader class of polyamide acids which can have units of formula (1) and (2) or units derived from the reaction of organic anhydrides and organic diamines as previously defined.

What I claim and desire to secure by Letters Patent of the United States are:

1. In a method for electrodepositing a polyamide acid onto a conducting substrate, utilizing an aqueous dispersion of said polyamide acid having a tendency to deteriorate when allowed to remain at ambient temperatures resulting in a polyamide acid mixture providing an electrodeposit of less than about 20% by weight of solids, which involves the improvement of maintaining the aqueous polyamide acid dispersion at a temperature between about −15° C to 15° C, prior to its electrodeposition and before it has substantially deteriorated, whereby the shelf life of such aqueous polyamide acid dispersion is substantially improved.

2. A method in accordance with claim 1, where the aqueous polyamide acid dispersion comprises (1) polyamide acid (2) organic solvent (3) water and (4) base, and said polyamide acid is the product of reaction of an organic dianhydride and an organic diamine, and the base is present in such aqueous polyamide acid dispersion in an amount sufficient to provide up to about 1 meq of base/g of polymer.

3. A method in accordance with claim 2, where the polyamide acid is made by effecting reaction between benzophenone dianhydride and 4,4'-methylene dianiline.

4. A method in accordance with claim 2, where the polyamide acid has been made by effecting reaction in the presence of N-methylpyrrolidone.

* * * * *